C. F. HIGHFIELD.
TRACTION DEVICE FOR AUTOMOBILE WHEELS.
APPLICATION FILED JAN. 29, 1920.

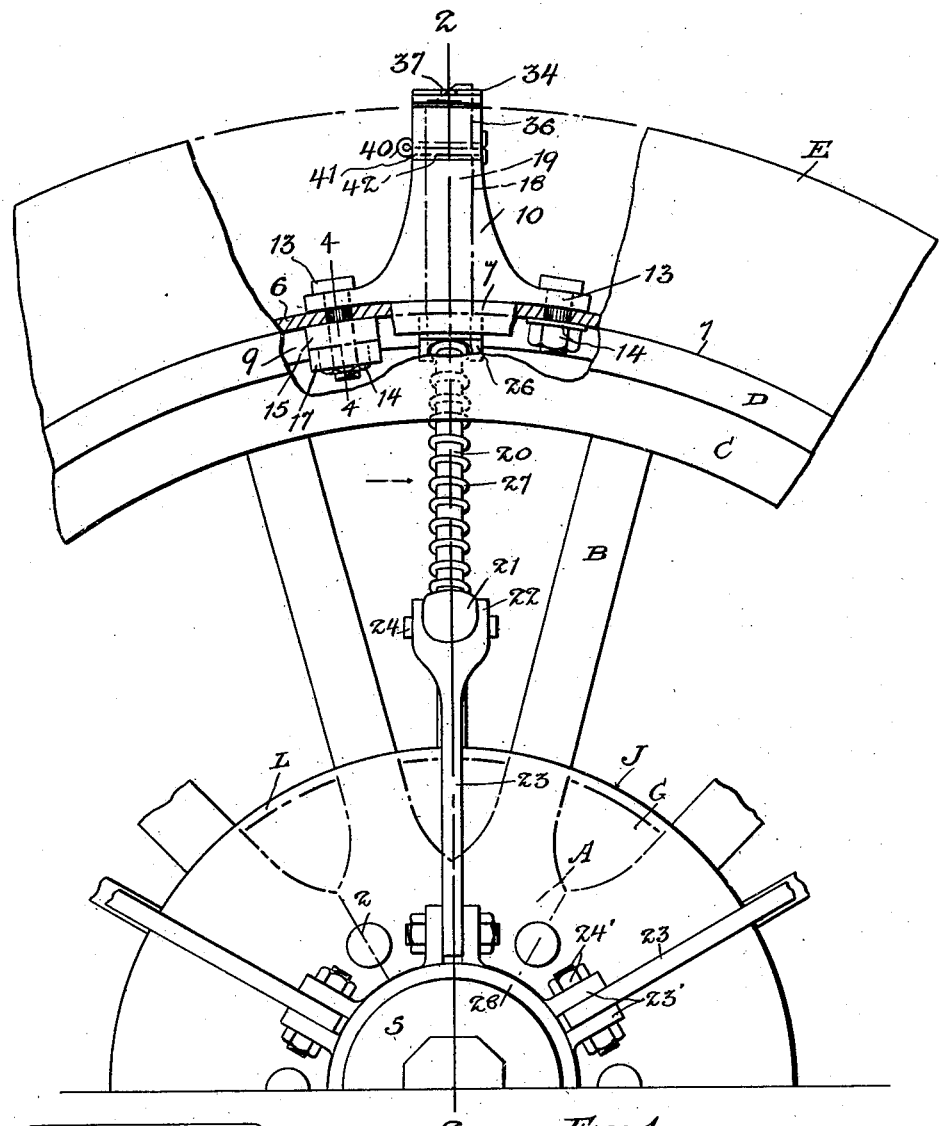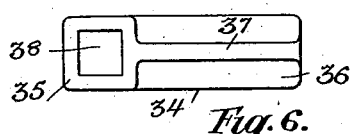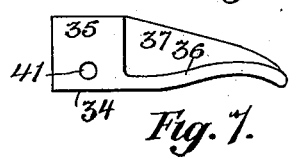

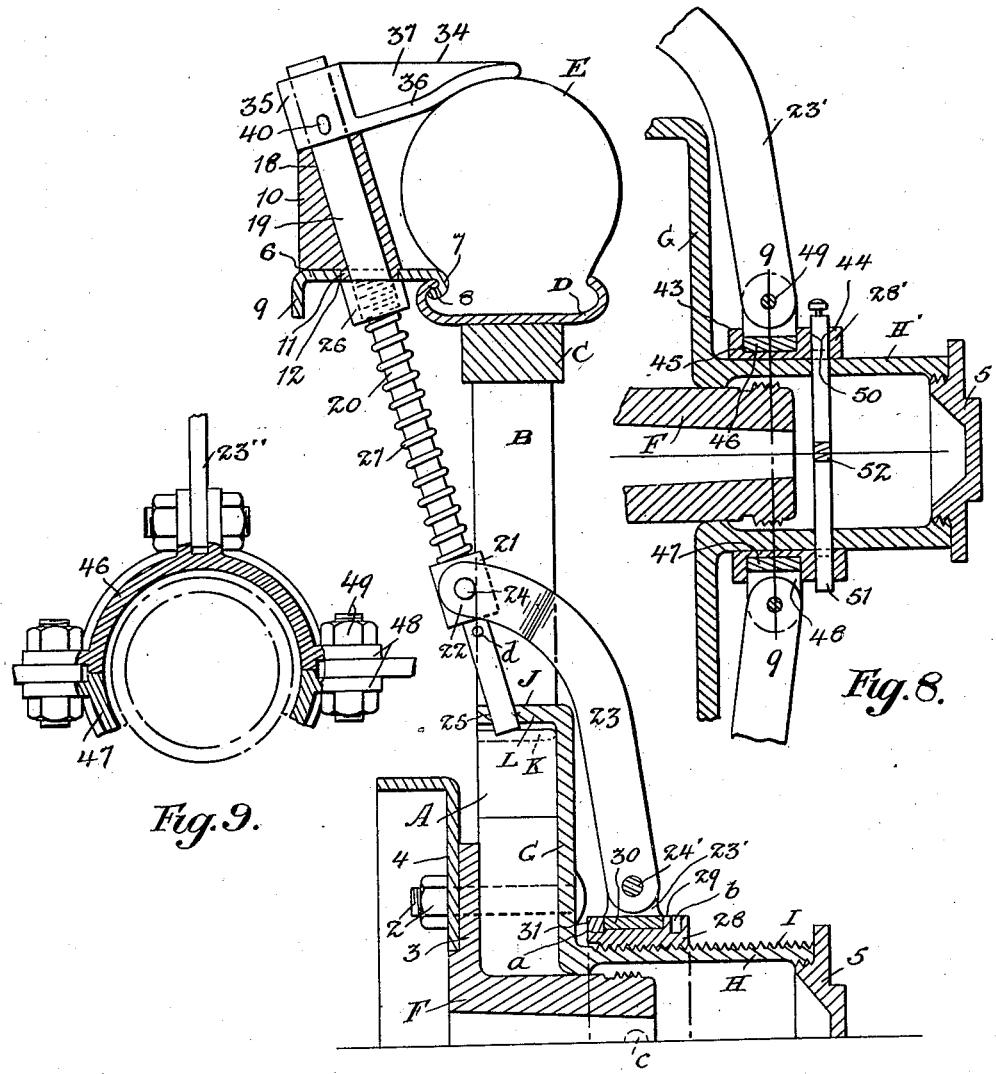

1,369,174.

Patented Feb. 22, 1921.
3 SHEETS—SHEET 3.

Inventor
C. F. Highfield
By Egerton R. Case
Attorney

UNITED STATES PATENT OFFICE.

CHARLES FREDERICK HIGHFIELD, OF SALTCOATS, SASKATCHEWAN, CANADA.

TRACTION DEVICE FOR AUTOMOBILE-WHEELS.

1,369,174.  Specification of Letters Patent.  Patented Feb. 22, 1921.

Application filed January 29, 1920. Serial No. 354,818.

*To all whom it may concern:*

Be it known that I, CHARLES FREDERICK HIGHFIELD, a subject of the King of Great Britain, of Saltcoats, Province of Saskatchewan, Canada, have invented certain new and useful Improvements in Traction Devices for Automobile-Wheels, of which the following is a specification.

My invention relates to improvements in traction devices for automobile wheels, and the object of my invention is to improve in several respects hereinafter noted, the device patented to me on Oct. 2nd, 1917, under number 1241848, and in the following specification I shall set forth the construction and advantages of my improvements, and what I claim as new will be set forth in the claims forming part of this specification.

Figure 3:
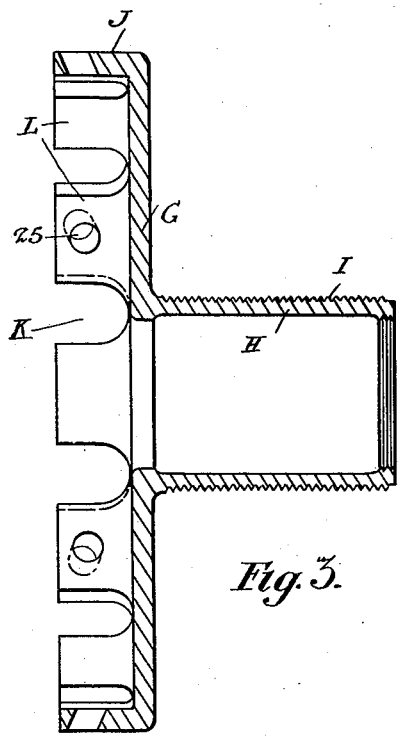
Figure 5:
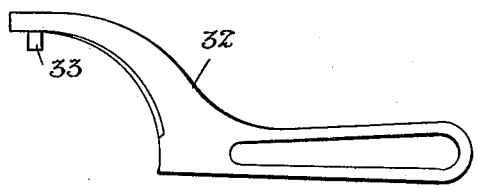
Figure 4:
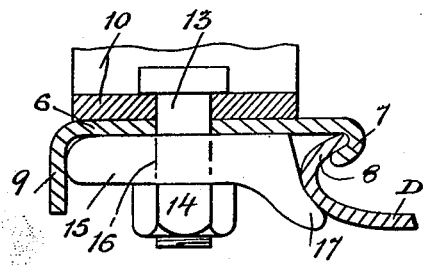

Figure 1 is an end elevation of portion of a motor vehicle wheel, from the outer side thereof, showing the same equipped with my device. Fig. 2 is a vertical cross section on the line 2—2, Fig. 1. Fig. 3 is a vertical central longitudinal section through the improved hub attachment for my device. Fig. 4 is a vertical transverse section on the line 4—4, Fig. 1. Fig. 5 is a side elevation of a suitable spanner wrench used when my device is adjusted by hand after the car is brought to rest. Fig. 6 is a plan view of a suitable type of mud grip or shoe that may be used, and Fig. 7 is a side elevation thereof. Fig. 8 is a vertical central longitudinal section through a modified form of hub attachment for my device adapted to co-act with an adjusting element so that the device may be operated without stopping the car, and Fig. 9 is, in part, a vertical cross section on the line 9—9, Fig. 8.

In the drawings, like characters of reference refer to the same parts.

The device disclosed in my said patent was associated with the wheel on the inner side thereof, and to attach the same, the construction of the car had to be more or less altered. Now with my improved construction, the device is largely associated with a wheel at the outer side thereof, thus obviating any necessity of having to alter the construction of the car, thus greatly reducing cost of installation.

My new design greatly increases the strength of the various parts and gives better control over the spikes, which is an important feature.

Although the device is shown as designed particularly for association with the standard type of wheel used on the Ford automobile, it will be understood by one skilled in the art that various modifications within the scope of mechanical ingenuity may be readily made in order to attach my improved construction to any type of motor-vehicle wheel, whether the same have solid, cushion, or a pneumatic tire.

A is the hub of the wheel; B the spokes thereof; C the felly, and D the metal rim, which is, as shown, the standard rim for the Ford automobile, and carried by the metal rim D is the tire E, shown diagrammatically, and F is a metal bushing for the hub A and the same of course is mounted on the axle (not shown). G is a hub-plate with which is integrally formed a hub H which in its preferred form is provided with an exterior thread I. The said hub-plate is integrally provided with an annular flange J, which is interrupted at intervals to provide openings K, which receive the spokes B of the wheel, and of course the separated portions L of said flange J are located between different parts of spokes B. The hub plate G is attached to the hub A, after any suitable manner as by means of bolts and nuts commonly designated 2, which pass therethrough, and through the flange 3 of the bushing F, as well as through the brake band 4. 5 is the hub cap which has internally-threaded engagement with the hub H. The construction just described is very compact, strong, and simple, and may be readily combined with the type of wheel already set forth.

As illustrated in Fig. 2, the hub H has engagement with the metal bushing F, portion of which it houses. 6 is a metal rim, interlocking with the metal rim D. As illustrated in Fig. 2, when my device is attached to a wheel already made, the rim 6 is provided with an annular curved flange 7 which interfits with one of the curved sides 8 of the rim D. The rim 6 extends around the wheel, and is stiffened by a flange 9 at its inner edge. 10 are bearings suitably secured to the rim 6, in any number desired. The preferred manner of coupling the said bearings 10 to the rim 6 is to provide each bearing at its inner end with a flange 11, which rests in a hole 12 formed in the rim 6. Passed through each side of each bearing 10 is a bolt 13 which carries a nut and washer, commonly designated 14, at its threaded end and beneath the rim 6. At intervals, are the bracing blocks 15, which are held in place by the bolts 13 and their associated nuts. These bolts pass through holes 16 (see dotted lines, Fig. 4) formed in the blocks 15, and the said blocks are snugly clamped in place against the under side of the rim 6, and snugly fit between the flange 9 and the curved side 8 of the rim D, because each block 15 is provided with an upward-downward curved lip 17, which snugly fits against the curved side 8 when the block is snugly positioned. This lip provides a considerable area of contact between each block 15 and the curved side 8 of the metal rim D so as to firmly support the metal rim 6.

As shown clearly in Fig. 2, each bearing block is provided with a passage-way 18 therethrough, inclined at an angle to the vertical. These passage-ways 18 open through the flanges 11, and receive the outer ends 19 of the spikes 20, which spikes pass through a swivel 21 pivoted in the bifurcated end 22 of each pressure link 23. Each swivel 21 is provided with a trunnion 24, whereby the same is pivoted in the bifurcated end 22.

The inner end of each spike 20 operates through a hole 25 formed in certain of the portions L of the flange J, and of course in the space between the spokes B. The said holes are inclined to occupy the same angular position as do the passage-ways 18 formed in the bearings 10 so that the spikes 20 may be located and as close to the tire as practicable. Screwing on the inner end of each outer end 19 is a threaded nut 26, shaped to fit against the underside of the rim 6. The said nuts limit positively the outer movement of the spikes 20, and mounted on each spike between the nut 26 and the swivel 21 is a compression spring 27. Since the spikes 20 operate through the holes 25, the said spikes are free to be depressed when the extreme outer ends thereof contact with hard surfaces of the roadway. Of course, normally the springs 27 maintain the spikes 20 in protracted position.

Now in order to completely withdraw the outer ends 19 of the spikes 20, below the tread of the rim E, when the spikes are not required for traction purposes, the pressure links 23 are operated. The means used to operate these pressure links in the form illustrated in Fig. 2, is as follows: 28 is an adjusting nut having threaded engagement with a thread I of the hub H, and one side of this adjusting nut is provided with a flange 29. 30 is a ring plate mounted on the adjusting nut 28, and the same is retained in place by a retaining ring 31, associated with one side of said adjusting nut 28 in any suitable manner to retain the same in place, as shown in Fig. 2. The said retaining ring may be retained in place by slightly flaring or spreading the outer corner of one side of the adjusting nut 28, as shown at *a*. As shown clearly in Fig. 2, the ring plate 30 is retained between the annular flange 29 and the retaining ring 31. The inner end of each pressure link 23 is pivoted between the lugs 23' by nuts and bolts, or equivalent means, commonly designated 24'. 32 is a spanner wrench, and in order to adjust the position of the adjusting nut 28 on the hub H, this spanner wrench is made use of, by inserting the pin 33 thereof in a hole *b* formed in the annular flange 29 so as to couple this wrench to said adjusting nut. After the adjusting nut 28 has been moved as desired, the same is coupled to the ring plate 30 by any suitable means such as a set screw *c*, carried by said ring plate, so as to prevent the shifting of said adjusting nut. It will be understood that as the adjusting nut 28 is moved toward the hub cap 5, the swivel 21 will be moved into engagement with any suitable stop *d*, which may be in the form of a pin, and thus withdraw the spikes 20. The stop *d* will contact with the portions L of the flange J and limit the inward movement of the said spikes.

There are of course a plurality of spikes 20, and each is provided with a pressure link 23, and of course any movement given the adjusting nut 28 gives a common movement to the parts just specified.

In Figs. 1, 6 and 7, I illustrate particularly a shoe 34 which is detachably carried by the extreme outer end of each spike 20. These shoes each comprise a hub 35 and a flange 36 braced to the hub by a web 37 which extends longitudinally of the hub. The opening 38 of each hub 35 is shaped to conform to the shape of the outer end 19, which is preferably square in cross section so as to prevent the rotation of the spikes 20 in the bearings 10.

Any suitable means may be employed to disengageably couple these shoes to the spikes 20, and suitable means for that purpose is in the form of a split pin 40, which passes through holes 41 formed in the hubs 35, as well as through holes 42 (see dotted lines, Fig. 1) formed in the ends 19 of the spikes 20.

The flanges 36 are curved to more or less fit at one portion of their length the contour of the tire E, and it will be understood that these shoes are only made use of in case a very bad portion of the roadway should be encountered, and the spikes 20 be unable to help the car therefrom. These shoes, as before set forth, are detachable, and can be readily removed after the car reaches good roadway: but of course while on the spikes the same cannot be withdrawn into the bearings 10.

In Figs. 8 and 9, I show a modified form of hub and operating means for the pressure links so that the spikes may be protracted and retracted by suitable lever mechanism without stopping the car. The hub H' is provided with a smooth outer surface, and mounted to slide thereon is an adjusting ring plate 28' which is provided with annular flanges 43 and 44, spaced apart, thus forming an annular groove 45 in which is mounted a ring-plate made of two portions 46 and 47 which are clamped around said ring-plate 28' by means of certain opposite pairs of lugs 48, which are coupled together by nuts and bolts, or equivalent means, commonly designated 49. The inner ends of the pressure links 23'' are associated with the lugs of the portions 46 and 47 of the ring-plate mounted between the flanges 43 and 44. The flange 44 is provided with an annular groove 50 in which operates the bifurcated end 51 of the lever 52; this lever is mounted after any suitable manner not necessary to illustrate, so that with suitable connections old in the art, its bifurcated ends 51 may be moved so as to shift the ring-plate 28' longitudinally on the hub H'.

From the foregoing specification, it will be very evident that my improved construction is much cheaper and stronger than that before patented to me, and the operation thereof is very simple, yet positive.

Obviously, changes falling within the scope of mechanical ingenuity may be made in the construction herein shown and described, which I rightly claim as falling within the terms of my claims.

What I claim is,

1. The combination with the wheel of a motor-vehicle comprising the hub; the spokes; and the metal rim, of a hub plate attached to said hub against the outer side thereof, and provided with a flange projecting rearwardly thereof, and interrupted by openings at intervals so as to provide flange members which extend between said spokes; a hub carried by said hub plate and surrounding the axle of said wheel; a rim associated with the metal rim of said wheel and positioned at the inner side thereof; a plurality of bearings carried by said second-mentioned rim and projecting outwardly therefrom; a plurality of spikes having movement in said bearings and extending through holes formed in said second-mentioned rim; a plurality of pressure links each having an outer bifurcated end in which a swivel member is mounted, and through which said spikes operate; a compression spring mounted on each of the said spikes and positioned between each swivel member thereof and means carried by said spikes adjacent the inner side of said second-mentioned rim; the inner ends of said spikes operating through the flange of said hub plate; means whereby said swivel member has engagement with said spikes to withdraw the same, and means mounted on said hub-plate hub with which the inner ends of said pressure links have pivotal engagement so that when said means is moved longitudinally on said hub-plate hub, said pressure links will be actuated to retract or protract said spikes, for the purpose specified.

2. The combination with the wheel of a motor-vehicle comprising the hub; the spokes; and the metal rim, of a hub plate attached to said hub against the outer side thereof, and provided with a flange projecting rearwardly thereof, and interrupted by openings at intervals so as to provide flange members which extend between said spokes; a hub carried by said hub plate and surrounding the axle of said wheel; a rim associated with the metal rim of said wheel and positioned at the inner side thereof; a plurality of bearings carried by said second-mentioned rim and projecting outwardly therefrom; a plurality of spikes having movement in said bearings and extending through holes formed in said second-mentioned rim; a plurality of pressure links each having an outer bifurcated end in which a swivel member is mounted, and through which said spikes operate; a compression spring mounted on each of the said spikes and positioned between each swivel member thereof and means carried by said spikes adjacent the inner side of said second-mentioned rim; the inner ends of said spikes operating through the flange of said hub plate; means whereby said swivel member has engagement with said spikes to withdraw the same; a plurality of bracing blocks clamped against the underside of said second-mentioned flange and resting against said wheel flange, and means mounted on said hub-plate hub with which the inner ends of said pressure links have pivotal engagement so that when said means is moved longitudinally of said hub-plate hub, said pressure links will be actuated to retract or protract said spikes, for the purpose specified.

3. The combination with the wheel of a motor-vehicle comprising the hub; the spokes; and the metal rim, of a hub plate attached to said hub against the outer side thereof, and provided with a flange projecting rearwardly thereof, and interrupted by openings at intervals so as to provide flange members which extend between said spokes; a hub carried by said hub plate and surrounding the axle of said wheel; a rim associated with the metal rim of said wheel and positioned at the inner side thereof; a plurality of bearings carried by said second-mentioned rim and projecting outwardly therefrom; a plurality of spikes having movement in said bearings and extending through holes formed in said second-mentioned rim; a plurality of pressure links each having an outer bifurcated end in which a swivel member is mounted, and through which said spikes operate; a compression spring mounted on each of the said spikes and positioned between each swivel member thereof and means carried by said spikes adjacent the inner side of said second-mentioned rim; the inner ends of said spikes operating through the flange of said hub plate; means whereby said swivel member has engagement with said spikes to withdraw the same; a traction shoe removably carried by the outer end of each of the said spikes where they project through said bearings, and adapted to rest in contact with the tire of the wheel, and means mounted on said hub-plate hub with which the inner ends of said pressure links have pivotal engagement so that when said means is moved longitudinally of said hub-plate hub, said pressure links will be actuated to retract or protract said spikes, for the purpose specified.

4. The combination with the wheel of a motor-vehicle comprising the hub; the spokes; and the metal rim, of a hub plate attached to said hub against the outer side thereof, and provided with a flange projecting rearwardly thereof, and interrupted by openings at intervals so as to provide flange members which extend between said spokes; an externally-threaded hub carried by said hub plate and surrounding the axle of said wheel; a rim associated with the metal rim of said wheel and positioned at the inner side thereof; a plurality of bearings carried by said second-mentioned rim and projecting outwardly therefrom; a plurality of spikes having movement in said bearings and extending through holes formed in said second-mentioned rim; a plurality of pressure links each having an outer bifurcated end in which a swivel member is mounted, and through which said spikes operate; a compression spring mounted on each of the said spikes and positioned between each swivel member thereof and means carried by said spikes adjacent the inner side of said second-mentioned rim; the inner ends of said spikes operating through the flange of said hub plate; means whereby said swivel member has engagement with said spikes to withdraw the same; an internally-threaded adjusting nut threading on said hub-plate hub and provided at one side thereof with an annular flange; a ring plate mounted on said adjusting nut and provided with a plurality of lugs with which the inner ends of said pressure links have pivotal engagement, and a retaining ring carried by said adjusting nut and positioned so as to retain said ring plate in position, the whole designed to co-act as set forth.

5. In combination with the drive wheel of a motor-vehicle comprising a hub; the spokes, and the metal rim, of a hub plate attached to said hub against the outer side thereof, and provided with a flange projecting rearwardly thereof, and interrupted by openings at intervals so as to provide flange members which extend between said spokes; a rim associated with the metal rim of said wheel and positioned at the inner side thereof, and provided at its inner edge with an inwardly extending stiffening flange; a plurality of bearings carried by said second-mentioned rim and projecting outwardly therefrom; a plurality of spring-provided spikes having movement in said bearings and extending through holes formed in said second-mentioned rim, and means under the control of the operator whereby said spikes are protracted and retracted at will.

6. The combination with the metal rim of a motor-vehicle wheel, of a metal rim associated therewith at the inner side thereof and projecting inwardly thereof and provided at its inner edge with an inwardly-projecting stiffening flange; a plurality of bracing blocks positioned against the inner side of said second-mentioned rim, and each provided at one end with a lip which contacts with the adjacent side of the metal rim of said vehicle wheel, the opposite end of each of said blocks resting against said stiffening flange, and means whereby said bearing blocks are clamped in position.

CHARLES FREDERICK HIGHFIELD.